United States Patent
Inaba et al.

(10) Patent No.: US 7,679,571 B2
(45) Date of Patent: Mar. 16, 2010

(54) ANTENNA DEVICE AND DOOR HANDLE DEVICE

(75) Inventors: Hisashi Inaba, Kariya (JP); Kiyokazu Ieda, Chiryu (JP); Rikuo Hatano, Toyota (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 51 days.

(21) Appl. No.: 11/661,595

(22) PCT Filed: Sep. 16, 2005

(86) PCT No.: PCT/JP2005/017188
§ 371 (c)(1),
(2), (4) Date: Mar. 1, 2007

(87) PCT Pub. No.: WO2006/035623
PCT Pub. Date: Apr. 6, 2006

(65) Prior Publication Data
US 2008/0100522 A1    May 1, 2008

(30) Foreign Application Priority Data
Sep. 28, 2004   (JP)   .............................. 2004-282501

(51) Int. Cl.
*H01Q 1/32*  (2006.01)
(52) U.S. Cl. ..................................................... 343/713
(58) Field of Classification Search ......... 343/711–713, 343/866
See application file for complete search history.

(56) References Cited

U.S. PATENT DOCUMENTS

| | | | |
|---|---|---|---|
| 4,816,837 A * | 3/1989 | Ohe et al. ................... | 343/713 |
| 4,819,001 A * | 4/1989 | Ohe et al. ................... | 343/712 |
| 4,823,141 A * | 4/1989 | Ohe et al. ................... | 343/713 |
| 4,853,703 A | 8/1989 | Murakami et al. | |
| 4,916,582 A | 4/1990 | Okamura et al. | |
| 4,935,747 A | 6/1990 | Yuichi et al. | |

(Continued)

FOREIGN PATENT DOCUMENTS

EP       1617509 A1    1/2006

(Continued)

OTHER PUBLICATIONS

International Search Report for PCT/JP2005/017188 dated Nov. 22, 2005.

(Continued)

*Primary Examiner*—Huedung Mancuso
(74) *Attorney, Agent, or Firm*—Buchanan Ingersoll & Rooney PC (57) ABSTRACT

A transmission/reception antenna (21) comprises a core (31) and a coil (32) wound around the core (31). One of a plurality of core sheets (31*a*) constituting the core (31) is utilized as a sensor electrode (23). Conductors (33, 34) extending from the two ends of the coil (32) are connected to a transmission/reception drive circuit (22). The conductor (35) extending from a capacitance detector (24) is connected to one of the conductors (33, 34) extending between the coil (32) and the transmission/reception drive circuit (22). Consequently, the capacitance detector (24) is alternately connected to the sensor electrode (23) through a parasitic capacitance C1 generated between the coil (32) and the sensor electrode (23) (core sheet (31*a*)).

11 Claims, 4 Drawing Sheets

U.S. PATENT DOCUMENTS

| | | | |
|---|---|---|---|
| 4,990,927 A | 2/1991 | Ieda et al. | |
| 5,003,319 A | 3/1991 | Murakami et al. | |
| 5,164,739 A | 11/1992 | Koide et al. | |
| 5,173,712 A | 12/1992 | Murakami et al. | |
| 5,497,165 A | 3/1996 | Murakami et al. | |
| 5,512,910 A | 4/1996 | Murakami et al. | |
| 5,526,007 A | 6/1996 | Murakami et al. | |
| 5,541,615 A | 7/1996 | Koide et al. | |
| 6,304,168 B1 | 10/2001 | Ohta et al. | |
| 6,583,764 B2 | 6/2003 | Ieda et al. | |
| 6,664,936 B2 | 12/2003 | Ieda et al. | |
| 6,768,413 B1 | 7/2004 | Kemmann et al. | |
| 6,774,789 B2 | 8/2004 | Inaba et al. | |
| 6,795,032 B2 * | 9/2004 | Ieda et al. | 343/713 |
| 6,799,107 B2 | 9/2004 | Mushiake et al. | |
| 6,812,823 B2 | 11/2004 | Inaba et al. | |
| 6,825,748 B1 | 11/2004 | Ibata et al. | |
| 6,933,831 B2 | 8/2005 | Ieda et al. | |
| 6,976,726 B2 * | 12/2005 | Hirota et al. | 296/146.1 |
| 7,049,940 B2 | 5/2006 | Ieda et al. | |
| 7,057,124 B2 | 6/2006 | Ieda et al. | |
| 7,091,823 B2 | 8/2006 | Ieda et al. | |
| 7,132,768 B2 | 11/2006 | Ieda et al. | |
| 7,180,281 B2 | 2/2007 | Inuzuka et al. | |
| 7,199,317 B2 | 4/2007 | Ieda et al. | |
| 7,307,593 B2 | 12/2007 | Ieda et al. | |
| 7,333,021 B2 | 2/2008 | Ieda et al. | |
| 2003/0063037 A1 * | 4/2003 | March et al. | 343/711 |
| 2004/0066294 A1 | 4/2004 | Ieda et al. | |
| 2004/0075531 A1 | 4/2004 | Ieda et al. | |
| 2004/0222804 A1 | 11/2004 | Inuzuka et al. | |
| 2004/0223336 A1 | 11/2004 | Murakami et al. | |
| 2004/0251709 A1 * | 12/2004 | Kobayashi et al. | 296/146.1 |
| 2004/0257296 A1 | 12/2004 | Ieda et al. | |
| 2004/0262139 A1 | 12/2004 | Ieda et al. | |
| 2005/0073804 A1 | 4/2005 | Maruyama et al. | |
| 2005/0073818 A1 | 4/2005 | Hirano et al. | |
| 2005/0230237 A1 | 10/2005 | Ieda et al. | |
| 2005/0285717 A1 | 12/2005 | Ieda et al. | |
| 2006/0164311 A1 | 7/2006 | Ieda et al. | |
| 2007/0008235 A1 | 1/2007 | Tsukahara et al. | |
| 2007/0096905 A1 | 5/2007 | Ieda et al. | |
| 2008/0061933 A1 | 3/2008 | Ieda et al. | |
| 2008/0067050 A1 | 3/2008 | Ieda et al. | |
| 2008/0068129 A1 | 3/2008 | Ieda et al. | |
| 2008/0100522 A1 | 5/2008 | Inaba et al. | |
| 2008/0290668 A1 | 11/2008 | Ieda et al. | |

FOREIGN PATENT DOCUMENTS

| | | |
|---|---|---|
| GB | 995314 | 6/1965 |
| JP | 59-24533 | 7/1984 |
| JP | 60-233904 | 11/1985 |
| JP | 63-115403 | 5/1988 |
| JP | 02-054415 A | 2/1990 |
| JP | 02-069908 A | 3/1990 |
| JP | 7-51788 | 11/1995 |
| JP | 10-317747 | 12/1998 |
| JP | 11-280319 | 10/1999 |
| JP | 2001-520337 | 10/2001 |
| JP | 2002-030844 | 1/2002 |
| JP | 2002-106214 | 4/2002 |
| JP | 2003-013628 A | 1/2003 |
| JP | 2003-020838 | 1/2003 |
| JP | 2004-328120 * | 4/2003 |
| JP | 2004-346703 * | 5/2003 |
| JP | 2004-027559 A | 1/2004 |
| JP | 2006-096104 | 4/2006 |
| JP | 2003-163925 A | 6/2006 |
| WO | 99/46784 A1 | 9/1999 |
| WO | WO 2004/095636 A1 | 11/2004 |

OTHER PUBLICATIONS

English Translation of International Preliminary Report on Patentability and Written Opinion, issued in corresponding International Patent Application No. PCT/JP2005/017188 on Apr. 3, 2007 by the International Bureau of WIPO, Geneva, CH.

* cited by examiner

ANTENNA DEVICE AND DOOR HANDLE DEVICE

FIELD OF THE INVENTION

The present invention relates to an antenna device for use in an electronic key system for recognizing the intention of a user to lock or unlock a vehicle door and controlling the locking and unlocking of the vehicle door, and a door handle device including the antenna device.

BACKGROUND OF THE INVENTION

Patent publication 1 discloses a vehicle door handle used in an electronic key system for locking and unlocking a vehicle door in response to a portable device carried by a user. The vehicle door handle disclosed in patent document 1 accommodates a transmission antenna for communicating with the portable device and a sensor electrode for detecting the user approaching the vehicle door based on a change in capacitance. The transmission antenna includes a core and a coil, which is formed by winding conductive wire around the core. The coil is connected to a transmission drive circuit, which transmits a transmission request signal from the transmission antenna. The sensor electrode is accommodated in the door handle and exposed from the door handle so as to face an outside panel of the vehicle door. The sensor electrode is also connected to a capacitance detector, which detects changes in the capacitance between the sensor electrode and the outside panel.

The user approaches the vehicle and first puts his or her hand on the door handle when opening the vehicle door. Therefore, it is desirable that the transmission antenna and the sensor electrode be arranged inside the door handle to achieve the functions of the electronic key system.

The door handle does not accommodate only the transmission antenna and the sensor electrode, and the space inside the door handle is not large. In order to accommodate a plurality of components in the door handle, the door handle must be enlarged. Otherwise, limitations are applied to the shape of the door handle in accordance with the shapes of the components accommodated in the door handle. Therefore, it is desirable that the number of components accommodated in the door handle be reduced.

One method for reducing the number of components incorporated in the door handle would be to use the core of the antenna as the sensor electrode. In this case, the core used as the sensor electrode must be electrically connected to the capacitance detector by, for example, conductive wire. However, it is difficult to connect the conductive wire, which extends from the capacitance detector, to the core. Furthermore, it is desirable that a waterproof structure be provided for a connection point between the core and the conductive wire. However, such a waterproof structure would increase the manufacturing cost.

Patent Publication 1: Japanese Laid-Open Patent Publication No. 2003-13628

SUMMARY OF THE INVENTION

It is an object of the present invention to provide an antenna device and a door handle device in which a core and a capacitance detector are electrically connected to each other without arranging a connection point between the core and the conductive wire, which extends from the capacitance detector.

To achieve the above object, the present invention provides an antenna device having an antenna including a core made of a conductive alloy and a coil wound around the core. A sensor electrode is formed by at least part of the core. A capacitance detector is electrically connected to the coil to detect a capacitance change at the sensor electrode.

In the present invention, the capacitance detector is electrically connected to the coil. The capacitance detector and the core (sensor electrode) are connected so that alternating current flows therebetween due to parasitic capacitance generated between the core and the coil. As a result, the core and the capacitance detector are electrically connected without an electrical connection point between the core and conductive wire, which extends from the capacitance detector, and at least part of the core functions as the sensor electrode.

In a preferred aspect of the present invention, the antenna device further includes a communication drive circuit connected to the coil. The capacitance detector is connected to a conductive wire extending between the coil and the communication drive circuit.

Therefore, the capacitance detector only needs to be connected to the conductive wire near the communication drive circuit, and the conductive wire extending from the capacitance detector does not need to be extended to the vicinity of the sensor electrode.

In one aspect of the present invention, the antenna device further includes a transmission drive circuit, connected to the coil, for transmitting an electrical signal from the antenna. A switch is arranged between the coil and the transmission drive circuit. The capacitance detector is connected to a conductive wire extending between the coil and the switch.

In this case, the capacitance detector is disconnected from the transmission drive circuit by opening the switch. Accordingly, even if, for example, the transmission drive circuit includes a MOSFET having parasitic capacitance and the MOSFET is grounded, the portion of the sensor electrode around which a coil is wound is prevented from becoming a non-detection area regardless of the magnitude of the parasitic capacitance of the MOSFET. The switch is closed when transmitting an electrical signal from the antenna.

In another aspect of the present invention, the antenna further includes a transmission drive circuit, connected to the coil, for transmitting an electrical signal from the antenna. A transformer is arranged between the coil and the transmission drive circuit. The capacitance detector is connected to a conductive wire extending between the coil and the transformer.

The coil and the transceiver drive circuit are connected by the transformer. Thus, the coil and the transceiver drive circuit are connected so that alternating current flows therebetween and direct current does not flow therebetween. The transformer disconnects the capacitance detector and the transmission drive circuit so that direct current does not flow therebetween. Therefore, even if the transmission drive circuit includes a MOSFET having parasitic capacitance and the MOSFET is grounded, the portion of the sensor electrode around which the coil is wound is prevented from becoming the non-detection area regardless of the magnitude of the parasitic capacitance of the MOSFET. Further, the coil and the transmission drive circuit are connected by the transformer so that alternating current flows therebetween. Thus, the electrical signal output from the transmission drive circuit is transmitted from the antenna through the transformer. Therefore, unlike when the coil and the transmission drive circuit are connected by switches. a control circuit for controlling a switch is not necessary. Thus, the antenna device does not have to be enlarged.

In the preferred embodiment, it is preferred that the core be made of amorphous alloy.

In the present invention, the core is preferably made of amorphous alloy. Amorphous alloy is conductive and has higher permeance and superior high frequency characteristics in comparison with, for example, steel plates or silicon plates. Accordingly, the amorphous alloy core sheet is optimal for use as a highly sensitive sensor electrode and contributes to enhancing the performance and miniaturization of the transceiver antenna.

The present invention also provides a door handle device including the above antenna device and a handle arranged outside a vehicle door. The antenna is accommodated in the handle.

In the present invention, at least part of the coil is easily used as the sensor electrode. This reduces the number of components accommodated in the handle.

DETAILED DESCRIPTION OF THE PREFERRED EMBODIMENTS

First Embodiment

A first embodiment of the present invention will now be described with reference to the drawings.

Figure 2:
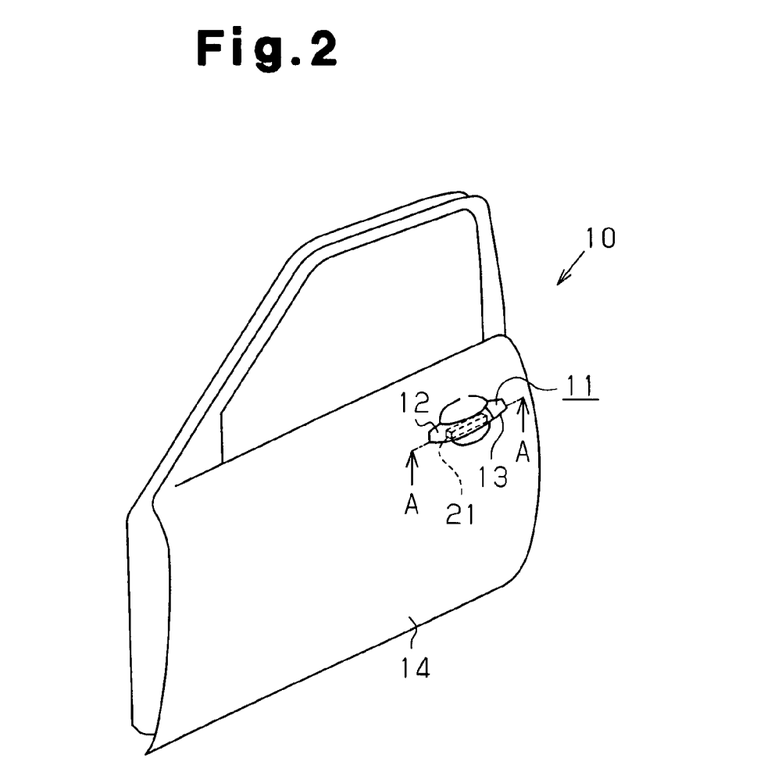
FIG. 2 is a perspective view showing a vehicle door using the antenna device of FIG. 1.

As shown in FIG. 2, an outside handle 11 is arranged on a vehicle door 10. The outside handle 11 is attached to a door outer panel 14 of the vehicle door 10 at the rear side of the vehicle door 10.

Figure 3:
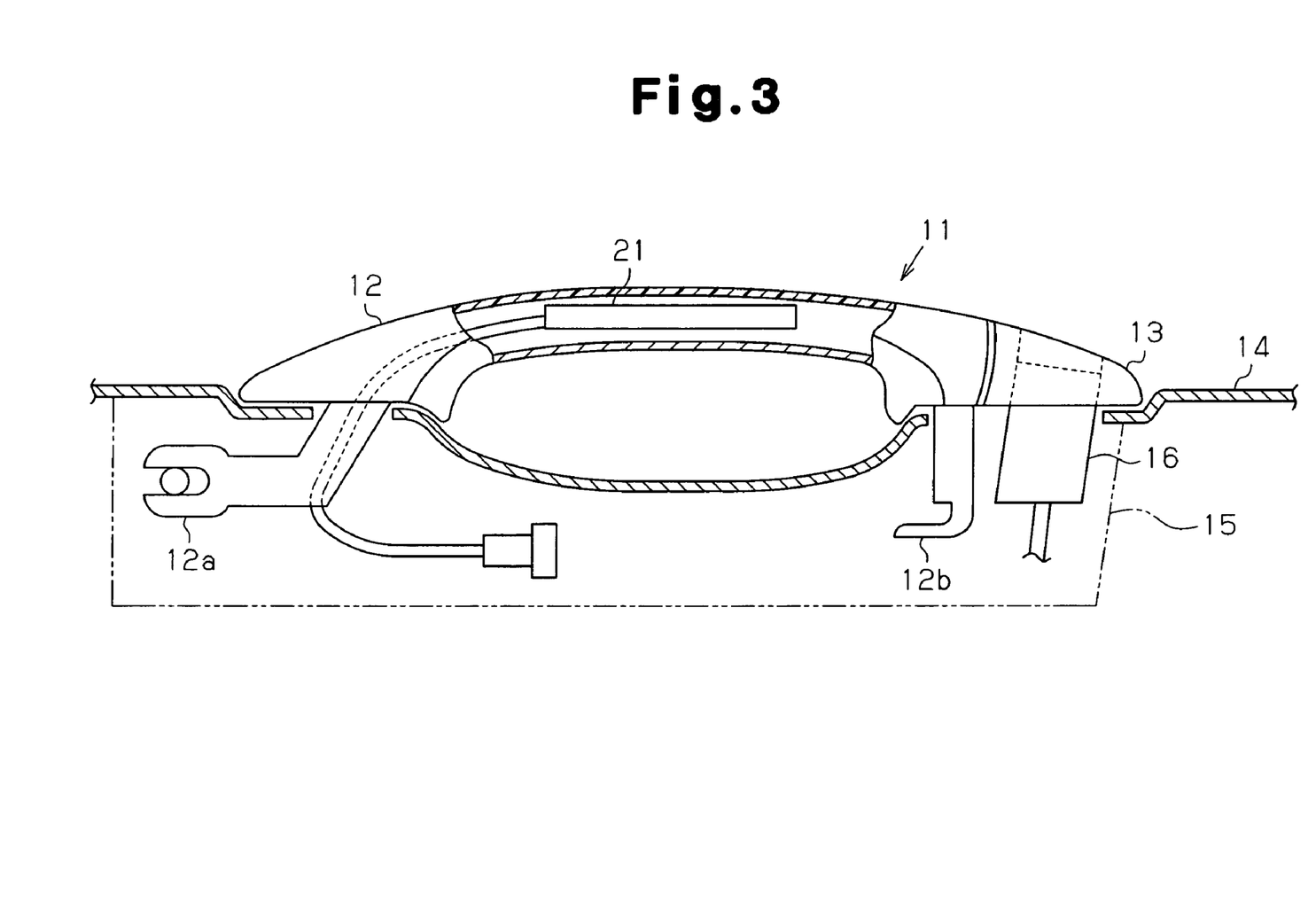
FIG. 3 is a partially cutaway view taken along line A-A in FIG. 2 and showing an outside door handle for the vehicle door of FIG. 2.

As shown in FIG. 3, the outside handle 11 includes a handle portion (grip) 12, a handle cap 13 projecting out of the vehicle from the door outer panel 14, and a handle frame 15 fixed to the door outer panel 14 inside the vehicle door 10. A user (e.g., owner, driver, passenger of the vehicle) grips and pivots the handle portion 12 when opening and closing the vehicle door 10. The handle portion 12 is connected to the handle frame 15 in a manner that it is pivotal in a predetermined range and so that the door outer panel 14 is arranged between the handle portion 12 and the handle frame 15. More specifically, a hinge arm 12a and a stroke arm 12b are respectively arranged at the two ends of the handle portion 12. The hinge arm 12a is extended through the door outer panel 14 and pivotally connected to the handle frame 15. The stroke arm 12b is extended through the door outer panel 14 and engaged with the handle frame 15 so that it is pivotal in the predetermined range. This enables the handle portion 12 to be pivoted about the hinge arm 12a within the range tolerated by the stroke arm 12b.

A key cylinder 16 is attached to the handle frame 15 adjacent to the handle portion 12. The handle cap 13 is attached to the key cylinder 16 to enclose the key cylinder 16. That is, the handle cap 13 is fixed to the handle frame 15 by means of the key cylinder 16.

An electronic system for recognizing the intention of the user to lock or unlock the vehicle door 10 and control the locking and unlocking of the vehicle door includes a device (in-vehicle device 20) arranged in the vehicle and a portable device (not shown) carried by the user.

Figure 4:
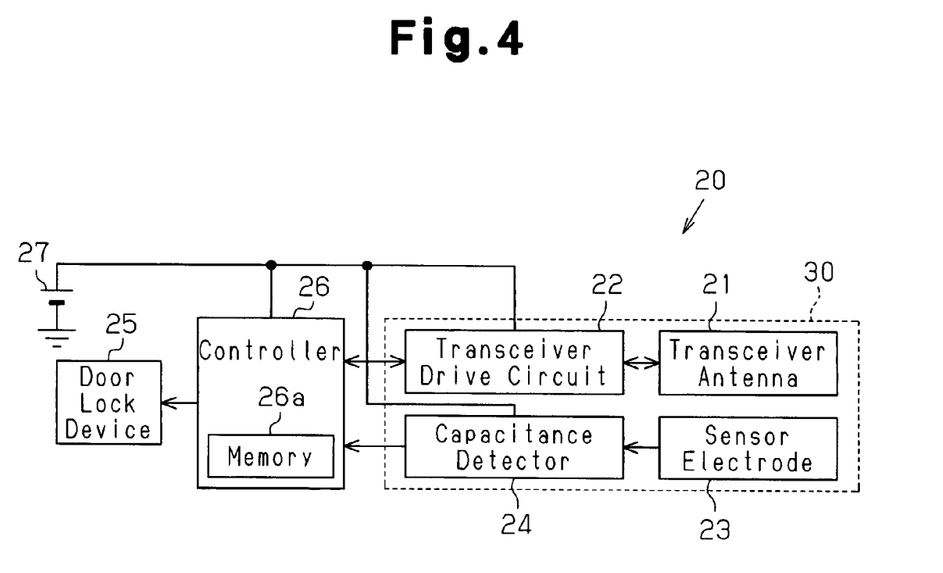
FIG. 4 is a block diagram showing the electrical configuration of part of an electronic key system including the antenna device of FIG. 1.

As shown in FIG. 4, the in-vehicle device 20 includes a transceiver antenna 21, a transceiver drive circuit (communication drive circuit) 22, a sensor electrode 23, a capacitance detector 24, a door lock device 25, and a controller 26. The transceiver antenna 21, the transceiver drive circuit 22, the sensor electrode 23, and the capacitance detector 24 form the antenna device 30. The antenna device 30 and the outside handle 11 form the door handle device. The transceiver drive circuit 22, the capacitance detector 24, and the controller 26 are supplied with power from an in-vehicle battery 27.

The transceiver antenna 21 is accommodated in the outside handle 11 (see FIG. 3) and connected to the controller 26 by the transceiver drive circuit 22. The transceiver antenna 21 receives radio waves (response signal) from outside and inside the passenger compartment. Further, the transceiver antenna 21 transmits radio waves (request signal) as an electrical signal outside the passenger compartment. The transceiver antenna 21 is arranged in the outside handle 11, which is arranged at the outer side of the vehicle door 10. Thus, the transceiver antenna 21 optimally radiates radio wave outside of the vehicle with the desired radiation pattern without being shielded by the metal vehicle body.

The transceiver drive circuit 22 is connected to the controller 26. The transceiver drive circuit 22 is controlled by the controller 26 and transmits the request signal via the transceiver antenna 21 to recognize whether the portable device carried by the user is the portable device having identification information (identification code) registered in a memory 26a of the controller 26. The portable device transmits the response signal containing the identification information when receiving the request signal. The transceiver drive circuit 22 transmits the request signal to the controller 26 when receiving the response signal from the portable device via the transceiver antenna 21.

The sensor electrode 23 is connected to the controller 26 by the capacitance detector 24. The sensor electrode 23 and the capacitance detector 24 form a capacitance sensor system and detect that the user has touched the outside handle 11. The capacitance detector 24, which is controlled by the controller 26, transmits a signal indicating that the user's hand has touched the handle portion 12 to the controller 26 when detecting a change in capacitance between the sensor electrode 23 and an opposing conductor, that is, a change in capacitance between the sensor electrode 23 and the door outer panel 14 or between the sensor electrode 23 and ground.

The controller 26 controls the transceiver drive circuit 22, the capacitance detector 24, the door lock device 25, and the like. The controller 26 drives the door lock device 25 based on the transfer of various signals to lock and unlock the vehicle door 10.

As shown in FIG. 3, the handle portion 12 is hollow, and the transceiver antenna 21 is accommodated in the handle portion 12. The transceiver antenna 21 is mechanically fixed inside the handle portion 12.

Figure 1:
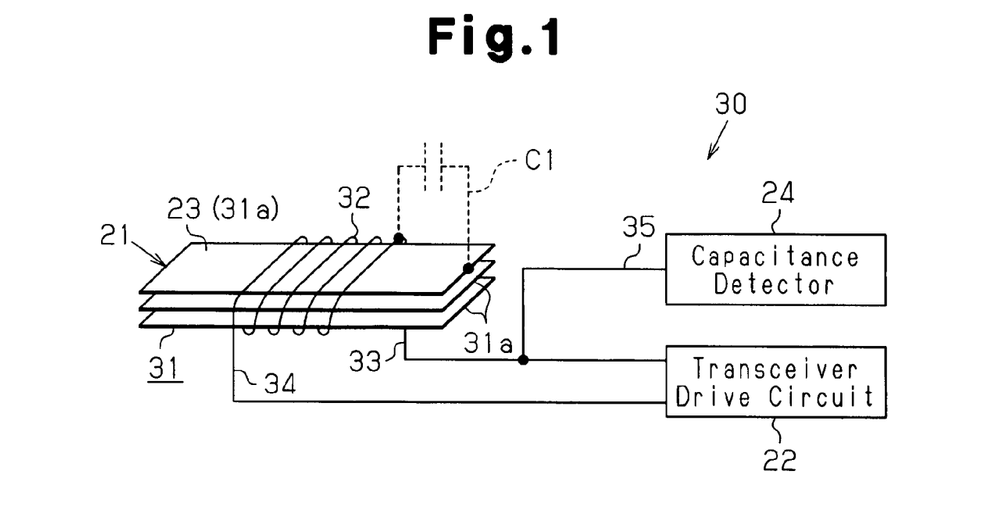
FIG. 1 is a block diagram showing the electrical configuration of an antenna device according to a first embodiment of the present invention.

As shown in FIG. 1, the transceiver antenna 21 has the form of a loop antenna and includes a core 31 and a coil 32, which is formed by winding a conductive wire around the core 31.

The core 31 is formed by stacking a plurality of core sheets 31a made of an amorphous alloy in a manner that the core sheets 31a are spaced apart from each other in the thickness-wise direction of the core sheet 31a. One of the core sheets 31a is used as the sensor electrode 23. For example, the core sheet 31a located at the uppermost position in FIG. 1 is used as the sensor electrode 23 in the first embodiment.

Conductive wires 33 and 34 extending from the two ends of the coil 32 are connected to the transceiver drive circuit 22. A conductive wire 35 extending from the capacitance detector 24 is connected to one of the two conductive wires 33 and 34 extending between the coil 32 and the transceiver drive circuit 22, in this case, the conductive wire 33. Accordingly, the capacitance detector 24 is electrically connected to the coil 32 by the conductive wire 35 and the conductive wire 33. Therefore, the capacitance detector 24 is connected to the sensor electrode 23 so that alternating current flows therebetween due to parasitic capacitance C1 generated between the coil 32 and the sensor electrode 23.

The operation of the electronic key system including the portable device and the in-vehicle device 20 will now be described.

For example, when the vehicle is in a parked state, the controller 26 of the in-vehicle device 20 drives the transceiver drive circuit 22 to transmit radio waves (request signal) outside the vehicle via the transceiver antenna 21. When a user carrying the portable device approaches the vehicle, the portable device receives the request signal from the vehicle. The portable device then transmits radio waves (response signal) containing the identification information (identification code).

In the in-vehicle device 20, the response signal from the portable device is received by the transceiver antenna 21 and transmitted to the controller 26. The controller 26 recognizes that the portable device is approaching the vehicle based on the reception of the response signal and verifies the identification information contained in the response signal with the identification information prestored in the memory 26a.

If the identification information contained in the response signal is identical to the identification information stored in the memory 26a, the controller 26 shifts to a door unlocking request detection mode to check the intention of the user to unlock the vehicle door 10. In the door unlocking request detection mode, the controller 26 detects capacitance changes in the sensor electrode 23 with the capacitance detector 24. More specifically, when the user places his or her hand on the handle portion 12, a capacitance change occurs between the sensor electrode 23 and the door outer panel 14 or between the sensor electrode 23 and ground. The capacitance detector 24 detects such capacitance change and transmits a signal indicating that the user's hand has touched the handle portion 12. When receiving the signal, the controller 26 drives the door lock device 25 and unlocks the vehicle door 10. As a result, the user can open the vehicle door 10 and enter the vehicle.

The first embodiment has the advantages described below.

(1) The conductive wire 35, which extends from the capacitance detector 24, is connected to the conductive wire 33, which extends from the coil 32, to connect the coil 32 to the transceiver drive circuit 22. That is, the capacitance detector 24 is connected to the coil 32. The capacitance detector 24 and the core sheets 31a are connected so that alternating current flows therebetween due to the parasitic capacitance C1 generated between the core sheets 31a and the coil 32, and a core sheet 31a functions as the sensor electrode 23. More specifically, the core 31 and the capacitance detector 24 are electrically connected without an electrical connection point between the core 31 and the conductive wire 35 extending from the capacitance detector 24. This enables one of the core sheets 31a forming the core 31 to function as the sensor electrode 23. This reduces the number of components accommodated in the handle portion 12. Thus, the outside handle 11 does not have to be enlarged, and the degree of freedom in the shape for the outside handle 11 is increased. Furthermore, a waterproof structure does not have to be provided since there is no need for an electrical connection point between the core 31 and the conductive wire 35. This suppresses manufacturing costs.

(2) The core 31 is configured by a plurality of core sheets 31a made of an amorphous alloy. Amorphous alloy is conductive and has higher permeance and superior high frequency characteristics in comparison with, for example, steel plates or silicon plates. Therefore, the amorphous alloy core sheet 31a is optimal for use as a highly sensitive sensor electrode 23 in the capacitance sensor system. Further, the amorphous alloy core 31 contributes to enhancing the performance and miniaturization of the transceiver antenna 21. This enables further miniaturization of the handle portion 12, which accommodates the transceiver antenna 21, and further increases the degree of freedom of the shape of the outside handle 11.

(3) The conductive wire 35, which extends from the capacitance detector 24, is connected to the conductive wire 33, which extends from the coil 32 to the transceiver drive circuit 22. The capacitance detector 24 and the sensor electrode 23 (core sheet 31a) are thus connected so that alternating current flows therebetween due to the parasitic capacitance C1 generated between the sensor electrode 23 and the coil 32. The conductive wire 35 extending from the capacitance detector 24 only needs to be connected to the conductive wire 33 near the transceiver drive circuit 22, and the conductive wire 35 does not need to be extended to the vicinity of the sensor electrode 23, that is, to the inside of the handle portion 12. This minimizes the amount of wires accommodated in the handle portion 12, enables further miniaturization of the handle portion 12, and increases the degree of freedom in the shape for the outside handle 11.

Second Embodiment

A second embodiment of the present invention will now be described with reference to the drawings. Like or same reference numerals are given to those components that are the same as the corresponding components of the first embodiment, and such components will not be described in detail.

Figure 5:
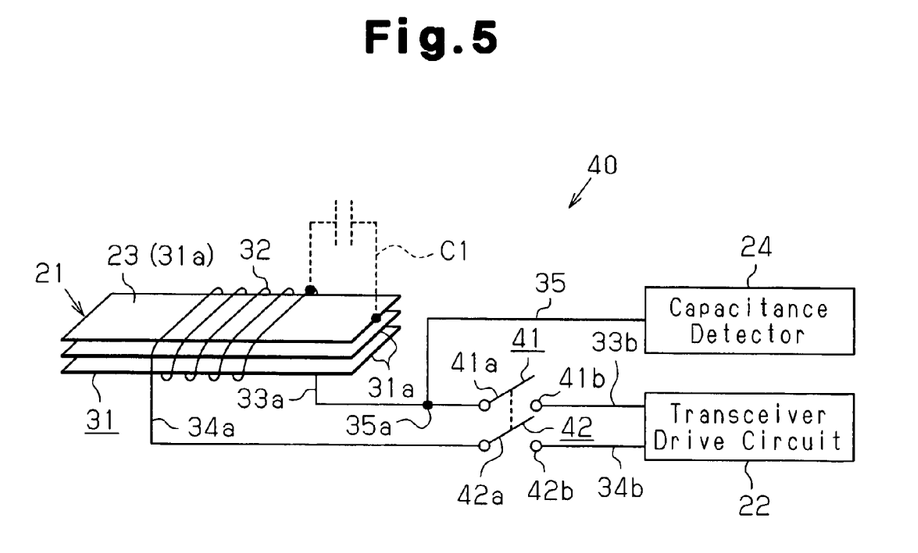
FIG. 5 is a block diagram showing the electrical configuration of an antenna device according to a second embodiment of the present invention.

FIG. 5 shows an antenna device 40 of the second embodiment. As shown in FIG. 5, the coil 32 and the transceiver drive circuit 22 are connected by switches 41 and 42. The conductive wire 35, which extends from the capacitance detector 24, is connected to a conductive wire 33a, which extends between the switch 41 and the coil 32, so that a connection point 35a is located on the conductive wire 33a. This electrically connects a capacitance detector 24 to the coil 32.

The switch 41 includes a movable terminal 41a connected to the conductive wire 33a extending from one end of the coil 32 and a contact point 41b connected to a conductive wire 33b extending from the transceiver drive circuit 22. The switch 42 includes a movable terminal 42a connected to a conductive wire 34a extending from the other end of the coil 32 and a contact point 42b connected to a conductive wire 34b extending from the transceiver drive circuit 22. The operation of the movable terminals 41a and 42a is controlled by the controller 26. That is, the controller 26 closes (activates) the switches 41 and 42 when driving the transceiver drive circuit 22. The controller 26 opens (inactivates) the switches 41 and 42 when driving the capacitance detector 24.

Figure 6:
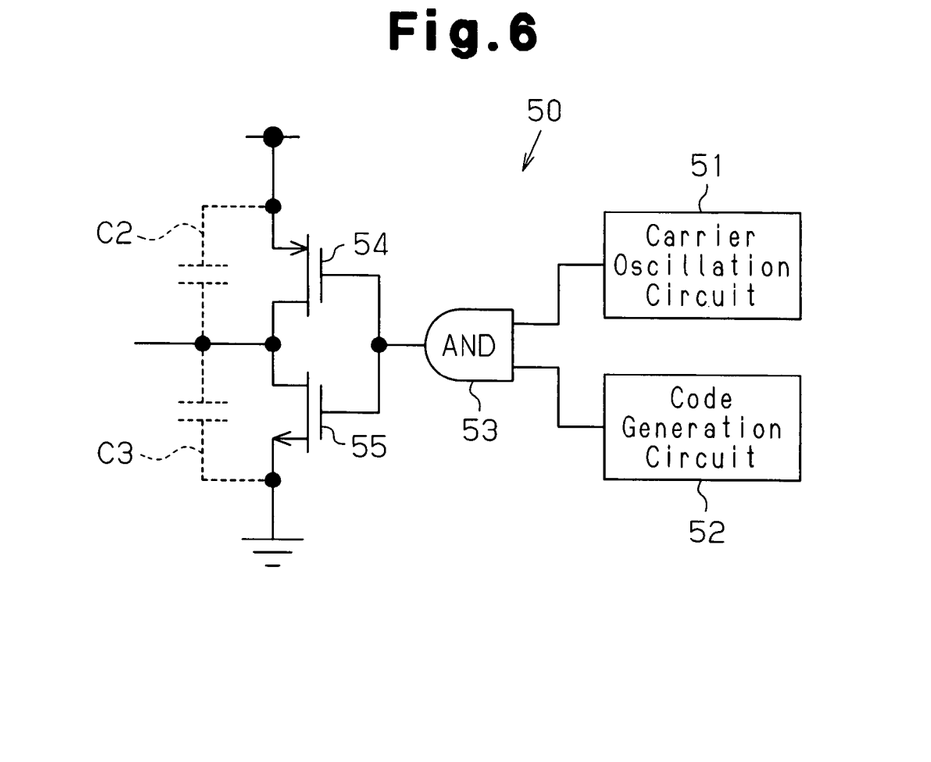
FIG. 6 is a block diagram showing the electrical configuration of a transmission drive circuit in the antenna device of FIG. 5.

FIG. 6 shows the electrical configuration of a transmission drive circuit 50 in the transceiver drive circuit 22. The transmission drive circuit 50 is driven to transmit the request signal from the transceiver antenna 21. As shown in FIG. 6, the transmission drive circuit 50 includes a carrier oscillation circuit 51 that oscillates a carrier signal (carrier wave), a code generation circuit 52 that generates a code signal for the request signal, an AND circuit 53, an n-channel MOS (Metal Oxide Semiconductor) FET (Field Effect Transistor) 54, and a p-channel MOSFET 55.

The carrier oscillation circuit 51 is connected to one input terminal of the AND circuit 53, and the code generation circuit 52 is connected to the other input terminal of the AND circuit 53. The output terminal of the AND circuit 53 is connected to the gate of the n-channel MOSFET 54 and the gate of the p-channel MOSFET 55.

The n-channel MOSFET 54 has a source connected to the in-vehicle battery 27 (see FIG. 4) and a drain connected to the coil 32 (see FIG. 5). The p-channel MOSFET 55 has a drain connected to the coil 32 (see FIG. 5) and a source that is grounded. In other words, the n-channel MOSFET 54 and the p-channel MOSFET 55 are combined in a complementary form to configure a C (Complementary)-MOS (Metal Oxide Semiconductor) inverter.

The controller 26 (see FIG. 4) drives the transmission drive circuit 50 so that the carrier oscillation circuit 51 oscillates the carrier signal and the code generation circuit 52 generates the code signal for the request signal. The code signal is superimposed on the carrier signal and output to the transceiver antenna 21, and the request signal is transmitted from the transceiver antenna 21.

In the antenna device 40, the n-channel MOSFET 54 and the p-channel MOSFET 55 are arranged in the transmission drive circuit 50, and the source of the p-channel MOSFET 55 is grounded. Parasitic capacitance C2 is generated between the source and the drain of the n-channel MOSFET 54, and parasitic capacitance C3 is generated between the source and the drain of the p-channel MOSFET 55.

It will now be assumed that the transceiver drive circuit 22 of the antenna device 30 in the first embodiment shown in FIG. 1 includes the transmission drive circuit 50 shown in FIG. 6. In the antenna device 30 of FIG. 1, the conductive wire 35, which extends from the capacitance detector 24, is connected to the conductive wire 33, which extends from the coil 32 to the transceiver drive circuit 22. Thus, the capacitance detector 24 is grounded via the parasitic capacitance C3 generated at the p-channel MOSFET 55. Generally, the amount of capacitance change detected when the user touches the handle portion 12 is about a few pF. Therefore, if the parasitic capacitance C3 generated at the p-channel MOSFET 55 is large compared to the capacitance detected at the sensor electrode 23, the portion of the sensor electrode 23 around which the coil 32 is wound may become a non-detection area incapable of detecting that the user's hand has been placed on the handle portion 12. Further, changes in the temperature or the like change the parasitic capacitance C3 of the p-channel MOSFET 55. Changes in the parasitic capacitance C3 is one factor causing variation in the detection sensitivity of the capacitance in the capacitance detector 24.

Comparatively, in the antenna device 40 of the second embodiment shown in FIG. 5, the transceiver drive circuit 22 and the coil 32 are connected by the switches 41 and 42. The controller 26 opens (inactivates) the switches 41 and 42 when driving the capacitance detector 24. That is, the capacitance detector 24 is mechanically disconnected from the transceiver drive circuit 22 including the transmission drive circuit 50 of FIG. 6. Therefore, when the controller 26 drives the capacitance detector 24, the capacitance detected by the capacitance detector 24 is not affected by the parasitic capacitance C3 generated in the p-channel MOSFET 55 regardless of the magnitude of the parasitic capacitance C3. Therefore, the portion of the sensor electrode 23 around which the coil 32 is wound is prevented from becoming a non-detection area:

In addition to the advantages (1) and (2) of the first embodiment, the second embodiment has the advantages described below.

(1) The coil 32 is disconnected from the transmission drive circuit 50 by opening the switches 41 and 42. Therefore, even if the transmission drive circuit 50 includes the p-channel MOSFET 55, which generates the parasitic capacitance C3 between the source and the drain and which source is grounded, the portion of the sensor electrode 23 around which the coil 32 is wound is prevented from becoming the non-detection area regardless of the magnitude of the parasitic capacitance C3. As a result, this prevents defects such as failure in detection of the user's hand touching the handle portion 12. The switches 41 and 42 are closed when the request signal is received from the transceiver antenna 21 or when the response signal is transmitted from the transceiver antenna 21.

Third Embodiment

A third embodiment of the present invention will now be described with reference to the drawings. Like or same reference numerals are given to those components that are the same as the corresponding components of the first and second embodiments, and such components will not be described in detail.

Figure 7:
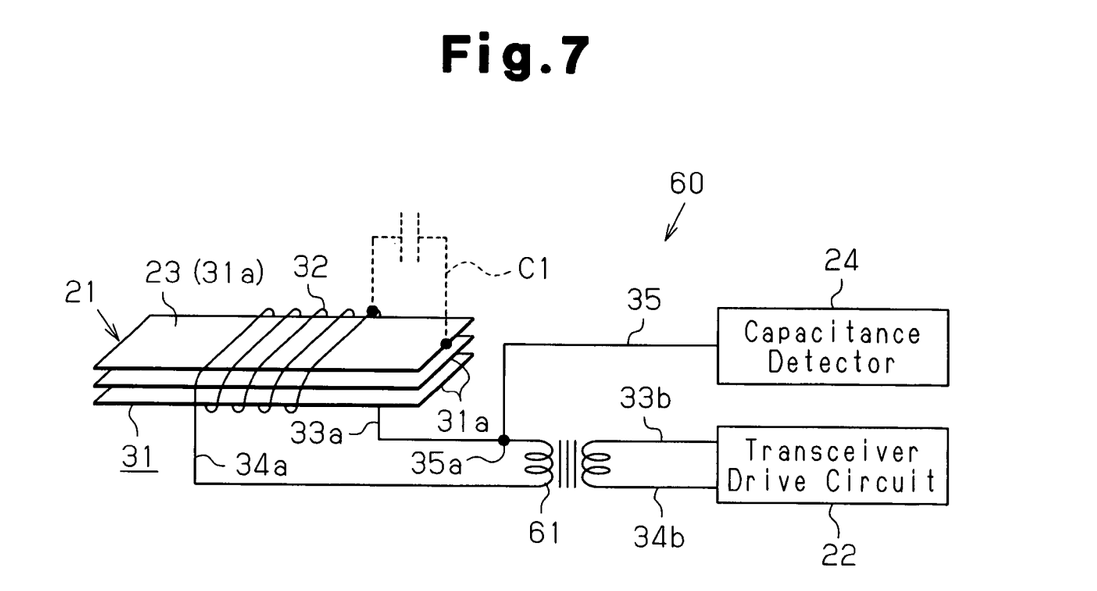
FIG. 7 is a block diagram showing the electrical configuration of an antenna device according to a third embodiment of the present invention.

FIG. 7 shows an antenna device 60 of the third embodiment. The antenna device 60 of the third embodiment includes the transmission drive circuit 50 in the same manner as in the transceiver drive circuit 22 of the second embodiment. As shown in FIG. 7, the coil 32 and the transceiver drive circuit 22 are connected by a transformer 61. The transformer 61 connects the coil 32 and the transceiver drive circuit 22 so that alternating current flows therebetween and direct current does not flow therebetween. The conductive wire 35, which extends from the capacitance detector 24, is connected to the conductive wire 33a so that the connection point 35a is located on the conductive wire 33a, which extends between the transformer 61 and the coil 32. This electrically connects the capacitance detector 24 to the coil 32.

In the antenna device 60, the capacitance detector 24 is disconnected from the transceiver drive circuit 22, which includes the transmission drive circuit 50, so that direct current does not flow therebetween. Thus, capacitance detected by the capacitance detector 24 is not affected by the parasitic capacitance C3 of the p-channel MOSFET 55 regardless of the magnitude of the parasitic capacitance C3 of the p-channel MOSFET 55. Accordingly, the portion of the sensor electrode 23 around which the coil 32 is wound is prevented from becoming a non-detection area.

In addition to the advantages (1) and (2) of the first embodiment, the third embodiment has the advantages described below.

(1) The coil 32 and the transmission drive circuit 50 are connected by the transformer 61. Thus, the coil 32 and the transceiver drive circuit 22 are connected so that alternating current flows therebetween and direct current does not flow therebetween. The transformer 61 disconnects the capacitance detector 24 from the transmission drive circuit 50 so that direct current does not flow therebetween. Therefore, even if the transmission drive circuit 50 includes the p-channel MOSFET 55, which generates the parasitic capacitance C3 between the source and drain and which source is grounded, the portion of the sensor electrode 23 around which the coil 32 is wound is prevented from becoming the non-detection area regardless of the magnitude of the parasitic capacitance C3. As a result, this prevents defects such as failure in detection of the user's hand touching the handle portion 12. Furthermore, the coil 32 and the transmission drive circuit 50 are connected by the transformer 61 so that alternating current flows therebetween. Thus, the switches 41 and 42 do not need to be controlled as in the second embodiment when receiving the request signal from the transceiver antenna 21 or when transmitting the response signal from the transceiver antenna 21. Accordingly, the switches 41 and 42 and a control circuit or the like for controlling the switches 41 and 42 are not necessary. Thus, the antenna device 60 does not have to be enlarged.

The embodiments of the present invention may be modified as described below.

In each of the above embodiments, the uppermost core sheet 31a in the plurality of core sheets 31a of the core 31 is used as the sensor electrode 23. However, the present invention is not limited in such a manner, and any one of the core sheets 31a other than the uppermost one in the core 31 may be used as the sensor electrode.

In each of the above embodiments, the core 31 is formed by stacking the plurality of core sheets 31a. However, the present invention is not limited in such a manner, and the core may be formed, for example, by compression-molding soft magnetic metal powder. In this case, the entire core 31 is used as the sensor electrode.

In each of the above embodiments, the core 31 may be coated by a sealing film. This prevents corrosion of the core 31 and improves the durability of the core 31.

In each of the above embodiments, the core sheet 31a is made of amorphous alloy. However, the core sheet 31a may also be made of a conductive alloy other than amorphous alloy.

The invention claimed is:

1. An antenna device comprising:
    an antenna including a core made of a conductive alloy and a coil wound around the core;
    a sensor electrode formed by at least part of the core, the coil being wound around the sensor electrode; and
    a capacitance detector, electrically connected to the coil, for detecting a capacitance change at the sensor electrode.

2. The antenna device according to claim 1, further comprising:
    a communication drive circuit connected to the coil;
    wherein the capacitance detector is connected to a conductive wire extending between the coil and the communication drive circuit.

3. The antenna device according to claim 1, further comprising:
    a transmission drive circuit, connected to the coil, for transmitting an electrical signal from the antenna; and
    a switch arranged between the coil and the transmission drive circuit;
    wherein the capacitance detector is connected to a conductive wire extending between the coil and the switch.

4. The antenna device according to claim 1, further comprising:
    a transmission drive circuit, connected to the coil, for transmitting an electrical signal from the antenna; and
    a transformer arranged between the coil and the transmission drive circuit;
    wherein the capacitance detector is connected to a conductive wire extending between the coil and the transformer.

5. The antenna device according to claim 1, wherein the core is made of amorphous alloy.

6. The antenna device according to claim 1, wherein the core is formed by stacking a plurality of core sheets, the sensor electrode being formed integrally with one of the core sheets.

7. A door handle device for a vehicle door, the door handle device comprising:
    an antenna including a core made of a conductive alloy and a coil wound around the core;
    a sensor electrode formed by at least part of the core, the coil being wound around the sensor electrode; and
    a capacitance detector, electrically connected to the coil, for detecting a capacitance change at the sensor electrode; and
    a handle arrangeable outside the vehicle door;
    wherein the antenna is accommodated in the handle.

8. The door handle device according to claim 7, further comprising:
    a communication drive circuit connected to the coil;
    wherein the capacitance detector is connected to a conductive wire extending between the coil and the communication drive circuit.

9. The door handle device according to claim 7, further comprising:
    a transmission drive circuit, connected to the coil, for transmitting an electrical signal from the antenna; and
    a switch arranged between the coil and the transmission drive circuit;
    wherein the capacitance detector is connected to a conductive wire extending between the coil and the switch.

10. The door handle device according to claim 7, further comprising:
    a transmission drive circuit, connected to the coil, for transmitting an electrical signal from the antenna; and
    a transformer arranged between the coil and the transmission drive circuit;
    wherein the capacitance detector is connected to a conductive wire extending between the coil and the transformer.

11. The door handle device according to claim 7, wherein the core is made of amorphous alloy.

* * * * *